United States Patent
Aldrich et al.

(10) Patent No.: US 8,640,786 B2
(45) Date of Patent: Feb. 4, 2014

(54) PERCUSSIVE AUGMENTER OF ROTARY DRILLS FOR OPERATING AS A ROTARY-HAMMER DRILL

(75) Inventors: Jack Barron Aldrich, Glendale, CA (US); Yoseph Bar-Cohen, Seal Beach, CA (US); Stewart Sherrit, La Crescenta, CA (US); Mircea Badescu, La Canada Flintridge, CA (US); Xiaoqi Bao, San Gabriel, CA (US); James Samson Scott, Torrance, CA (US)

(73) Assignee: California Institute of Technology, Pasadena, CA (US)

( * ) Notice: Subject to any disclaimer, the term of this patent is extended or adjusted under 35 U.S.C. 154(b) by 372 days.

(21) Appl. No.: 12/909,653

(22) Filed: Oct. 21, 2010

(65) Prior Publication Data

US 2011/0094765 A1    Apr. 28, 2011

Related U.S. Application Data

(60) Provisional application No. 61/254,392, filed on Oct. 23, 2009.

(51) Int. Cl.
  *B25D 11/02* (2006.01)
(52) U.S. Cl.
  USPC .............. 173/93; 173/29; 173/90; 173/104; 173/162.1
(58) Field of Classification Search
  USPC ................... 173/29, 1, 90, 93, 104
  See application file for complete search history.

(56) References Cited

U.S. PATENT DOCUMENTS

| 4,991,472 | A | * | 2/1991 | Hollingsworth | 81/464 |
|---|---|---|---|---|---|
| 5,449,043 | A | * | 9/1995 | Bourner et al. | 173/178 |
| 5,832,611 | A | * | 11/1998 | Schmitz | 30/392 |
| 6,223,671 | B1 | * | 5/2001 | Head | 114/230.2 |
| 6,863,136 | B2 | | 3/2005 | Bar-Cohen et al. | |
| 6,968,910 | B2 | | 11/2005 | Bar-Cohen et al. | |
| 7,156,189 | B1 | | 1/2007 | Bar-Cohen et al. | |

(Continued)

FOREIGN PATENT DOCUMENTS

| JP | 3855037 | 12/2006 |
|---|---|---|
| WO | 97/26090 | 7/1997 |

OTHER PUBLICATIONS

Bao X., Y. Bar-Cohen, Z. Chang, B. P. Dolgin, S. Sherrit, D. S. Pal, S. Du, and T. Peterson, IEEE Transaction on Ultrasonics, Ferroelectrics and Frequency Control (UFFC), vol. 50, No. 9, (Sep. 2003), pp. 1147-1160.

(Continued)

*Primary Examiner* — Brian D Nash
(74) *Attorney, Agent, or Firm* — Gates & Cooper LLP

(57) ABSTRACT

A percussive augmenter bit includes a connection shaft for mounting the bit onto a rotary drill. In a first modality, an actuator percussively drives the bit, and an electric slip-ring provides power to the actuator while being rotated by the drill. Hammering action from the actuator and rotation from the drill are applied directly to material being drilled. In a second modality, a percussive augmenter includes an actuator that operates as a hammering mechanism that drives a free mass into the bit creating stress pulses that fracture material that is in contact with the bit.

13 Claims, 4 Drawing Sheets

(56) References Cited

U.S. PATENT DOCUMENTS

| | | | | |
|---|---|---|---|---|
| 7,404,781 | B2* | 7/2008 | Milbourne et al. | 475/298 |
| 7,740,088 | B1 | 6/2010 | Bar-Cohen et al. | |
| 2001/0042630 | A1* | 11/2001 | Kristen et al. | 173/1 |
| 2003/0155141 | A1* | 8/2003 | Maras | 173/29 |
| 2004/0007387 | A1 | 1/2004 | Bar-Cohen et al. | |
| 2005/0103252 | A1 | 5/2005 | Brunning et al. | |
| 2006/0201688 | A1* | 9/2006 | Jenner et al. | 173/48 |
| 2007/0193757 | A1 | 8/2007 | Bar-Cohen et al. | |
| 2009/0031865 | A1* | 2/2009 | Alberti et al. | 81/57.11 |
| 2010/0288520 | A1* | 11/2010 | Dayton et al. | 173/1 |

OTHER PUBLICATIONS

Bar-Cohen Y., and Zacny, K. (Eds.), "Drilling in Extreme Environments—Penetration and Sampling on Earth and Other Planets" Wiley—VCH, Hoboken, NJ, 2009, pp. 347, 379-390, 741 and 743.

NDEAA's USDC Homepage, http://ndeaa.jpi.nasa.gov/nasa-nde/usde/usde.htm. Last uptdated Jul. 22, 2002.

International Search Report mailed Jul. 14, 2011, International application No. PCT/US2010/053598, International filing date Oct. 21, 2010.

* cited by examiner

PERCUSSIVE AUGMENTER OF ROTARY DRILLS FOR OPERATING AS A ROTARY-HAMMER DRILL

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/254,392, filed on Oct. 23, 2009, by Jack B. Aldrich, Yoseph Bar-Cohen, Stewart Sherrit, Mircea Badescu, Xiaoqi Bao, and James S. Scott, entitled "Percussive Augmenter of Rotary Drills (PARoD) for Operating as a Rotary-Hammer Drill."

STATEMENT REGARDING FEDERALLY SPONSORED RESEARCH AND DEVELOPMENT

The invention described herein was made in the performance of work under NASA contract NAS7-1407, and is subject to the provisions of Public Law 96-517 (35 USC 202), in which the Contractor has elected to retain title.

BACKGROUND OF THE INVENTION

1. Field of the Invention

The present invention relates generally to drills, and in particular, to a percussive augmenter of rotary drills (PARoD) for operating as a rotary-hammer drill.

2. Description of the Related Art (Note: This application references a number of different publications as indicated throughout the specification by citations enclosed in brackets, e.g., [x]. A list of these different publications ordered according to these citations can be found below in the section entitled "References." Each of these publications is incorporated by reference herein.)

There is a need for a drill that can be used to rapidly penetrate concrete walls while using minimum tool weight, size and power. In addition, there is a need for effective drills in interplanetary missions such as the Phoenix and MSL (Mars Science Laboratory) missions. In the Phoenix and MSL missions, a Phoenix Mars lander or surface rover targets a region using a robotic arm to dig and analyze the target environment including the geology and geochemistry of the region. Further, in-situ exploration missions (e.g., for NASA) increasingly require analysis of acquired samples to detect and characterize the presence of potential biomarkers of life and water, as well as determine the geological properties. For these missions, there is a critical need to produce samples using effective mechanisms. These problems may be better understood with a description of prior art drilling systems.

For planetary applications, prior art systems provided an ultrasonic/sonic driller/corer (USDC) [Bao, et al., 2003; Bar-Cohen et al., 1999; NDEAA Website] that addressed the need: (1) to use low axial forces and holding torques; (2) for lightweight hardware; and (3) for a drill that consumes low power with the ability to efficiently duty cycle the used power. To enhance the capability of the USDC, sensors were mounted on the USDC and allowed to conduct real-time measurements inside the drilled borehole [Bar-Cohen et al., 2005]. Following the development of USDC, additional designs were developed as disclosed in [Aldrich et al., 2006; Badescu et al., 2007; Bar-Cohen et al., 2002; Bar-Cohen et al., 2003; Bar-Cohen and Sherrit, 2003; Bar-Cohen et al., 2005a; Bar-Cohen et al., 2005b; Bar-Cohen et al., 2007; Sherrit et al., 2001; Sherrit et al., 2002; Sherrit et al., 2003].

FIG. 1 illustrates a photographic view of a USDC showing its ability to drill with minimum axial force (left), and a schematic diagram of its cross-section (right). As illustrated in FIG. 1, the USDC is a drill that consists of three key components: (1) an actuator (also called transducer); (2) a free-mass; and (3) a bit.

The actuator operates as an vibratory hammering mechanism that drives the free-mass into the bit creating stress pulses that fracture the rock or concrete that is in contact with the bit. The actuator consists of a stack of piezoelectric rings with backing for forward power delivery and a horn for amplification of the induced displacement. The USDC is actuated by a piezoelectric stack that is driven in resonance and is held in compression by a stress bolt that prevents its fracture during operation (the piezoelectric rings are made of ceramic that can break if subject to tension). In the basic design, the piezoelectric stack has a resonance frequency of about 20-kHz but drills with frequencies ranging from 5 to 30 kHz. The actuator drives a free-flying mass (free-mass), which bounces between the horn tip and the bit converting the mechanical impacts to hammering at sonic frequencies. The impacts of the free-mass create stress pulses that propagate to the interface of the bit and the material onto which the USDC is placed in contact. The drilled rock or concrete is fractured when its ultimate strain is exceeded at the rock/bit interface.

However, the above design does not perform rotary hammering in a manner that can be commercialized for the construction and remodeling industries. In this regard, while the prior art USDC may be useful and novel, it cannot be utilized with commercial products. Thus, prior art drills fail to provide an effective large diameter drill that performs high speed drilling and that also enhances the capability of commercial rotary drills. Also, there is a need to address the challenges that are inherent to other drills that include large mass and requirements of a high axial preload or weight on bit.

Accordingly, what is needed is an effective large diameter drill that performs high speed drilling, can be used with commercial rotary drills, and that include large mass and a high preload or weight on the drill bit.

SUMMARY OF THE INVENTION

One or more embodiments of the invention provide a novel drill bit that performs percussive action for use as an augmenter of rotary drills converting them into highly effective Rotary-Hammer Drills. The bit has two key modalities including one with free-mass (USDC-based design) and one without it allowing performance options.

Novel features of embodiments may include:

A piezoelectric actuated bit that percussively drills and operates as an augmenter of rotary drills to form rotary-hammering drills;

A bit design that allows for pneumatic and/or water cooling; and

A percussive drill bit with a modality of including free-mass allowing performance options.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a piezoelectric actuated percussive bit that augments rotary drills to form a highly effective rotary-hammering drill/sampler. The bit has two key modalities including one with vibrating free-mass (mechanical impacts) and one without it generating sonic/ultrasonic/vibratory axial movement of the bit teeth. The bit employs an electrical power transfer mechanism (e.g., an electrical slip-ring) and mechanical slip-rings to transfer electric power as well as water (for the removal of cuttings and bit cooling) while freely turning the bit. The cooling plumbing can be connected to the related fixtures on heavy-duty rotary drills.

Detailed Embodiments

Embodiments of the invention provide a percussive/vibratory augmenter of rotary drills that turns rotary drills into a highly effective rotary-hammering drill. A percussive drill bit is driven by an actuator (piezoelectric, electrostrictive, or magnetostrictive) and provides a rotation mechanism that effectively removes the cuttings and rock breaking to enhance the drilling speed. In this regard, prior designs of an integrated rotary-hammer drill have been shown to increase the drilling rate by a factor of 10 times.

In one or more embodiments of the invention, the well established capability of rotary drills are employed and their performance is enhanced by utilizing a percussive bit that augments their operation. The bit (referred to herein as the Percussive Augmenter of Rotary Drills [PARoD]) is either driven directly by a an actuator or via a free-mass and includes slots to assure that the tip of the bit does not rotate separately from the actuator. The impacts of the bit induce stress pulses that fracture the rock or concrete when the ultimate strain is exceeded.

Figure 1:
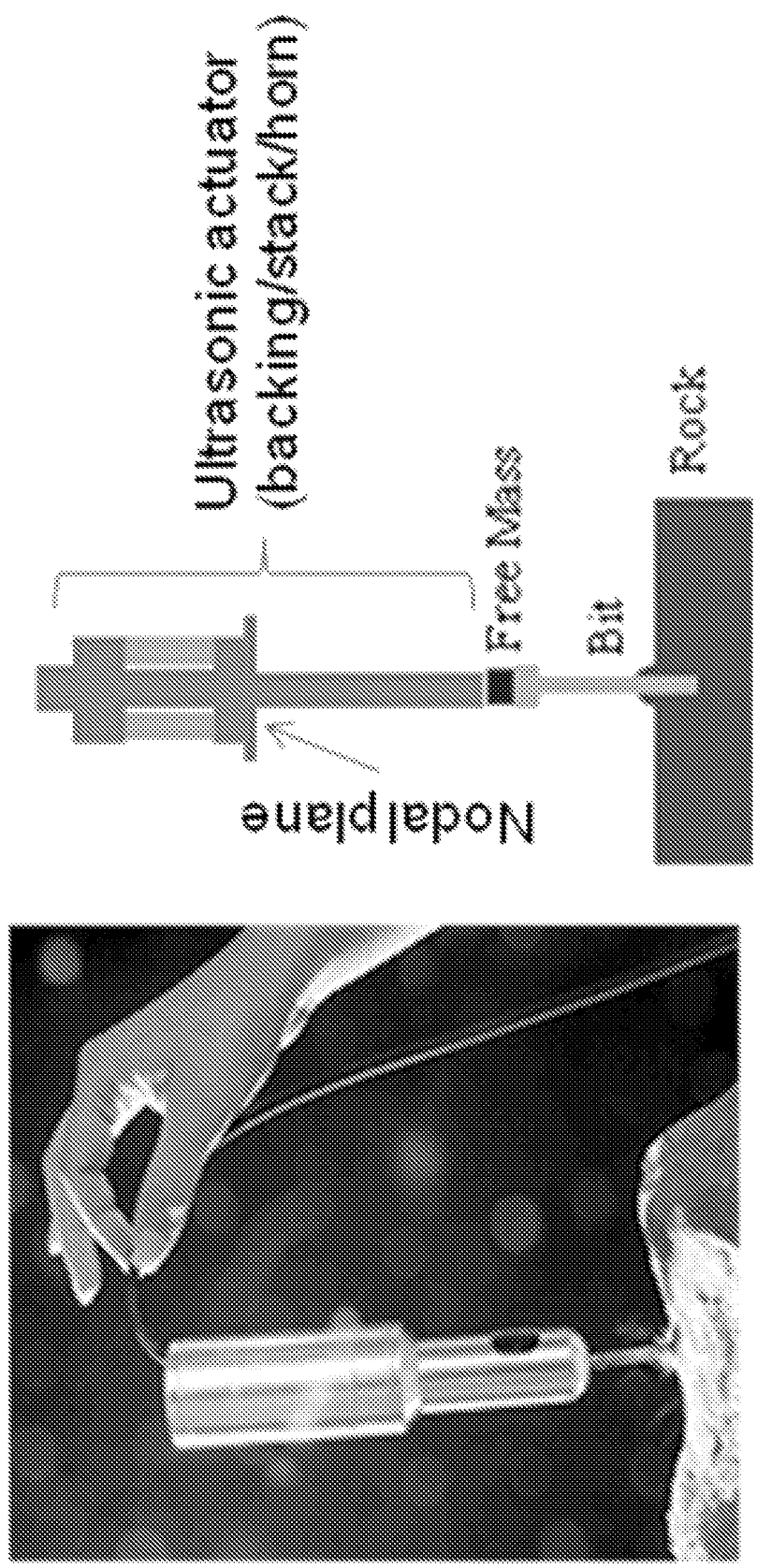
FIG. 1 illustrates a photographic view of an ultrasonic/sonic driller/corer (USDC) of the prior art.
Figure 2A:
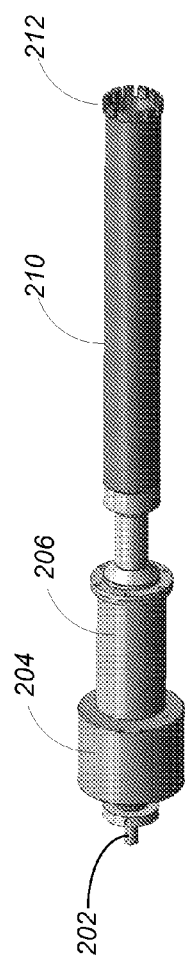
FIGS. 2A-2C illustrate an augmentation tool as a bit without free-mass in accordance with one or more embodiments of the invention.
Figure 2B:
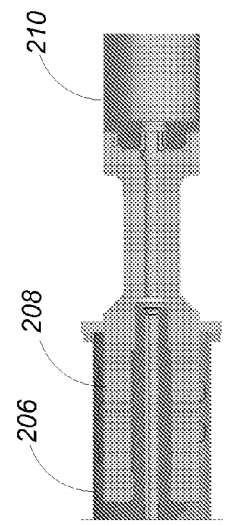
Figure 2C:
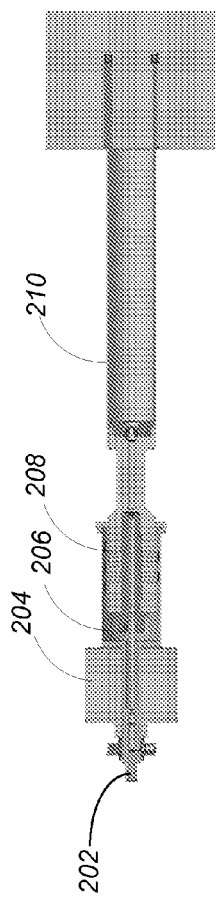
Figure 3B:
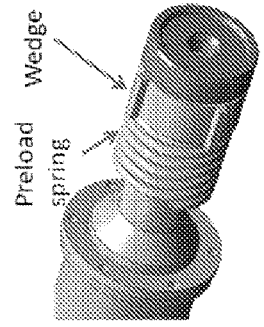
FIGS. 3A-3B illustrate a close-up illustration of the augmentation tool as a bit with free-mass in accordance with one or more embodiments of the invention.
Figure 3A:
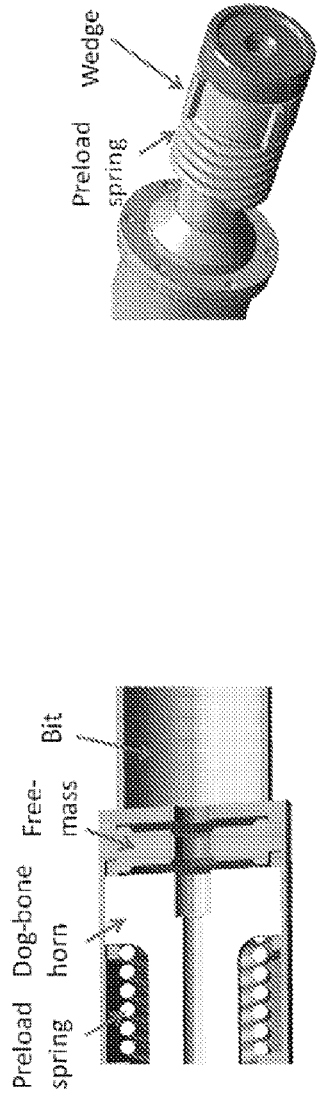

The PARoD tool is shaped as a bit that is mounted onto rotary drills and uses the power and cooling sources of units for the rotary actuation. The PARoD tool may be designed to the size scale of the ultrasonic/sonic Gopher developed and demonstrated at Antarctica, where a depth of 1.76-m in ice was reached [Bar-Cohen et al., 2005b]. The bit can be made in various diameters and the one demonstrated in Antarctica was about 5-cm in diameter. The bit design has two modalities:

(a) A bit without a free-mass—The vibratory hammering action from the actuator (e.g., a piezoelectric stack) and the rotation from the drill are applied directly to the drilled object (FIG. 2A-2C); and (b) A bit with a free-mass—This bit is designed to rotate the tip and transmit the impact of a free mass while the complete bit turns as a single unit (FIG. 3A-3B).

Two disclosed percussive bit designs are shown in FIGS. 2A-2C and FIGS. 3A-3B. FIGS. 2A-2C illustrate an augmentation tool as a bit without free-mass in accordance with one or more embodiments of the invention. More specifically, FIG. 2A is a solid model rendering of the bit, FIG. 2B is a cross-section of a close-up of drilling an object, and FIG. 2C is a full view of drilling an object. FIGS. 3A-3B illustrate a close-up illustration of the augmentation tool as a bit with free-mass in accordance with one or more embodiments of the invention. More specifically, FIG. 3A is a cross-section image showing the free-mass and a preload spring using a dog-bone horn configuration. FIG. 3B is a solid model rendering showing the horn, spring, and free-mass. The keys in FIG. 3B make the horn rotate with the bit.

The bit (whether with or without a free mass) has a connection shaft (e.g., connection shaft 202 of FIG. 2A-2B) that allows mounting the bit onto rotary drills (e.g., a commercial rotary drill). The left section in FIGS. 2A and 2C shows an electric slip-ring 204 (i.e., an electrical power transfer mechanism) that provides power to an actuator 206 (e.g., a piezoelectric, electorstrictive, or magnetostrictive actuator) with minimal electric noise while being rotated by the drill. In addition, FIGS. 2A-2C show a mechanical slip-ring 204 that provides water for bit cooling and borehole cleaning Note that the actuator 206 may be configured to induce minimal vibrations at the nodal plane that serves as the mounting section on the actuator structure. Such a configuration allows connecting the actuator 206 to the housing without transmitting vibrations from the actuator 206. The driving frequency is designed to operate at the resonance frequency of the piezoelectric stack. The actuator 206 may also be fabricated using a stack of piezoelectric rings with a backing layer for forward power delivery and a horn that amplifies the induced displacement.

The piezoelectric stack shown in FIGS. 2B and 2C (in addition to other designs) is designed to allow for water (as in commercial drills) to be used for the cooling as well as for the removal of the powdered cuttings and other concrete debris during drilling. The long hollow section 210 in FIGS. 2A-2C is the coring section of the bit and its internal hollow section length dictates how deep one can drill without the need to remove the produced core material.

At the cutting end of the bit in FIG. 2A there are teeth 212 shown with the same configuration as the commercial ones in a rotary type drill. This teeth 212 design can be altered if other designs are determined to be more effective or desired. The use of flutes on the surface of the bit is a potential modality of the bit and can be used while taking other effects into considerations such as the increase in the system weight. Alternative methods for the removal of the powdered cuttings can be used including asymmetric bristles on the bit external surface. The augmentation tool may be operational by a single person who is drilling while standing. However, less portable designs are also part of the modalities of the invention.

In order to supply the required high frequency power to the piezoelectric actuator 206, electric power transmitters such as commercially available electric slip-rings can be used in the design. Some of these slip-rings use fiber-brushes while others use mercury. Generally, fiber-brushes are preferred due to the health hazard and risk that is involved with the components that contain mercury. In selecting the most effective electric slip-ring, there are several considerations including cost (varies from tens to thousands of dollars), maximum operation speed, dimensions, as well as operating voltage and current. For example, the slip-ring model 2431-00 that is made by the company called Electro Miniatures™. This electric slip-ring model allows maximum rotation speed of 1000 RPM, maximum voltage of 750 V, maximum current of 10 Ampere, and it has an internal diameter of 0.75 inch and an external diameter of 3.75 inch. Although the 1000 RPM is typically lower than the no-load rotation speed of rotary drills, the maximum RPM of these slip-rings is sufficient for the disclosed rotary-hammering drill under load. For example the END 130/3PO of an exemplary drill may have a max no-load speed of 1800 RPM.

Figure 4:
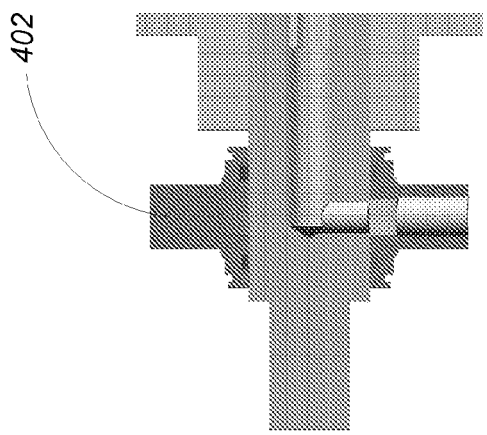
FIG. 4 is an exemplary plumbing configuration for a PARoD bit in accordance with one or more embodiments of the invention.

Using the water inlet that is provided with rotary drills, various configurations can be used for the delivery of the water through the PARoD bit. An example of a plumbing configuration for a PARoD bit is shown in FIG. 4. As illustrated, using the existing water inlet provided with customary rotary drills, water 402 can be supplied throughout the bit.

Drilling with the Percussive Augmenter

Figure 5:
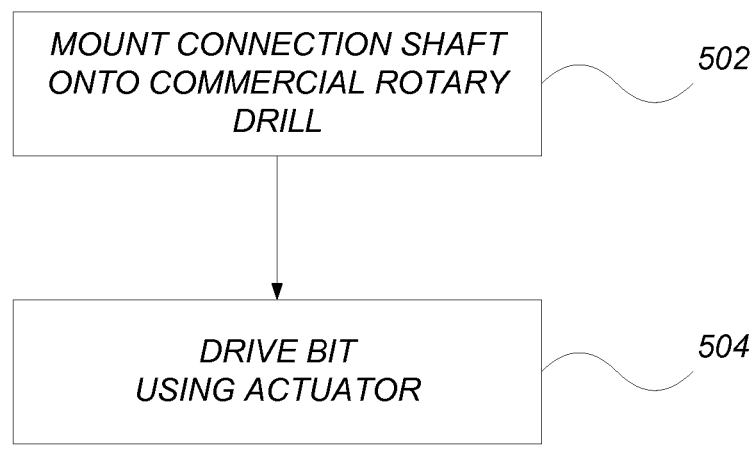
FIG. 5 is a flow chart illustrating the logical flow for drilling using the percussive augmenter in accordance with one or more embodiments of the invention.

FIG. 5 is a flow chart illustrating the logical flow for drilling using the percussive augmenter in accordance with one or more embodiments of the invention.

At step 502, a connection shaft of a percussive augmenter is mounted onto a rotary drill. The percussive augmenter (and bit) are rotated by the rotary drill.

At step 504, the percussive augmenter is percussively driven using an actuator. As described above, there are two modalities for the actuator.

In the first modality, an actuator is used and power is provided to the actuator using an electric power transfer mechanism (e.g., slip-ring) while being rotated by the rotary drill. Note that as used herein, an electrical power transfer mechanism is as a generic device that transmits electrical power from an external power supply that is stationary, to the rotating "percussion unit". A hammering action (e.g., a vibratory hammering action) from the actuator and rotation from the rotary drill are applied directly to a material being drilled. Keys and slots interfaces may be used to assure that a tip of the augmenter bit does not rotate separately from the actuator.

The actuator may be a piezoelectric actuator, an electrostrictive actuator, and/or a mangetostrictive actuator. Further, water for bit cooling and borehole cleaning may be provided using a mechanical slip-ring. In this regard, the actuator may allow for water to be used for cooling and the removal of extraneous materials. In addition, the bit may further have a hollow coring section. The length of an internal hollow section length (of the coring section) dictates a drilling depth (that can be used) without/before a need to remove produced material.

In the second modality, the actuator operates as a hammering mechanism and drives a free mass into a bit to create stress pulses that fracture material in contact with the bit. In such a modality, the actuator may include a stack of piezoelectric rings with backing for forward power delivery and a horn for amplifying induced displacement. The free mass bounces between a tip of the horn and the bit converting the pulses into hammering at sonic frequencies. The stack of rings may also include a preloaded spring and the horn may be in a dog-bone horn configuration. In addition, one or more keys (or wedges) may be used to cause the horn to rotate with the bit.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

Aldrich J., S. Sherrit, M. Badescu Y. Bar-Cohen, X. Bao, and Z. Chang, "Controller using extremum-seeking to drive heavily perturbed electroactive actuators at resonance", submitted on (Feb. 9, 2006).

Badescu M., S. Sherrit, Y. Bar-Cohen, X. Bao, and S. Kassab, "Ultrasonic/Sonic Rotary-Hammer Drill (USRoHD)," submitted on Dec. 19, 2006. Patent submitted on (Aug. 17, 2007).

Bao X., Y. Bar-Cohen, Z. Chang, B. P. Dolgin, S. Sherrit, D. S. Pal, S. Du, and T. Peterson, IEEE Transaction on Ultrasonics, Ferroelectrics and Frequency Control (UFFC), Vol. 50, No. 9, (September 2003), pp. 1147-1160.

Bar-Cohen Y., S. Sherrit, B. Dolgin, T. Peterson, D. Pal and J. Kroh, "Ultrasonic/Sonic Driller/Corer (USDC) With Integrated Sensors," New Technology Report (NTR) (Aug. 30, 1999).

Bar-Cohen Y., J. Randolph, C. Ritz, G. Cook and X. Bao, and S. Sherrit, "Sample Preparation, Acquisition, Handling and Delivery (SPAHD) System using the Ultrasonic/Sonic Driller/Corer (USDC) with Interchangeable Bits," (May 1, 2002).

Bar-Cohen Y., and S. Sherrit, "Thermocouple-on-the-bit a real time sensor of the hardness of drilled objects," NTR submitted on (Feb. 1, 2003).

Bar-Cohen Y., and S. Sherrit, "Self-Mountable and Extractable Ultrasonic/Sonic Anchor (U/S-Anchor)," submitted on (Dec. 9, 2003b).

Bar-Cohen Y., S. Sherrit, B. Dolgin, T. Peterson, D. Pal and J. Kroh, "Smart-ultrasonic/sonic driller/corer," U.S. Pat. No. 6,863,136, (Mar. 8, 2005a).

Bar-Cohen Y., S. Sherrit, B. Dolgin, X. Bao and S. Askins, "Ultrasonic/Sonic Mechanism of Deep Drilling (US-MOD)," U.S. Pat. No. 6,968,910, (Nov. 29, 2005).

Bar-Cohen Y., S. Sherrit and J. L. Herz "Ultrasonic/Sonic Jackhammer (USJ)," submitted on Oct. 31, 2003. Patent Ser. No. 11/700,575, (Jan. 31, 2007).

Bar-Cohen Y., and K. Zacny (Eds. and Coauthors), "Drilling in Extreme Environments" Wiley—VCH, Hoboken, N.J., to be published in (2009).

NDEAA's USDC Homepage, http://ndeaa.jpl.nasa.gov/nasa-ndc/usdc/usdc.htm.

Sherrit S., S. A. Askins, M. Gradziel, B. P. Dolgin, Y. Bar-Cohen, X. Bao, and Z. Cheng, "Novel Ultrasonic Horns for power ultrasonics," (Dec. 6, 2001), Sherrit S., Y. Bar-Cohen, B. Dolgin, X. Bao, and Z. Chang, "Ultrasonic Crusher for Crushing, Milling, and Powdering," (2002).

Sherrit S., Y. Bar-Cohen, X. Bao, Z. Chang, D. Blake and C. Bryson, "Ultrasonic/Sonic Rock Powdering Sampler and Delivery Tool," (Aug. 13, 2003).

What is claimed is:

1. A percussive augmenter bit, comprising:
   a connection shaft configured for mounting the percussive augmenter bit onto a rotary drill, wherein the percussive augmenter bit is rotated by the rotary drill;
   an actuator that percussively drives the percussive augmenter bit;

an electric power transmission mechanism that provides power to the actuator while being rotated by the rotary drill;
slots that assure a tip of the percussive augmenter bit does not rotate separately from the actuator;
wherein hammering action from the actuator and rotation from the rotary drill are applied directly to material being drilled.

2. A percussive augmenter bit, comprising:
a connection shaft configured for mounting the percussive augmenter bit onto a rotary drill, wherein the percussive augmenter bit is rotated by the rotary drill;
an actuator that percussively drives the percussive augmenter bit; and
an electric power transmission mechanism that provides power to the actuator while being rotated by the rotary drill;
wherein hammering action from the actuator and rotation from the rotary drill are applied directly to material being drilled; and
wherein the actuator comprises a piezoelectric actuator.

3. The percussive augmenter bit of claim 2 wherein the electric power transmission mechanism comprises a slip-ring.

4. The percussive augmenter bit of claim 2 wherein the hammering action comprises a vibratory hammering action.

5. The percussive augmenter bit of claim 2 further comprising a mechanical slip-ring that provides water for bit cooling and borehole cleaning.

6. The percussive augmenter bit of claim 2 wherein the actuator allows for water to be used for cooling and removal of extraneous materials.

7. A percussive augmenter bit, comprising:
a connection shaft configured for mounting the percussive augmenter bit onto a rotary drill, wherein the percussive augmenter bit is rotated by the rotary drill;
an actuator that percussively drives the percussive augmenter bit;
an electric power transmission mechanism that provides power to the actuator while being rotated by the rotary drill; and
a hollow coring section, wherein an internal hollow section length of the hollow coring section dictates a drilling depth without a need to remove produced core material;
wherein hammering action from the actuator and rotation from the rotary drill are applied directly to material being drilled.

8. A method for drilling material comprising:
mounting a connection shaft of a percussive augmenter bit onto a rotary drill, wherein the percussive augmenter bit is rotated by the rotary drill;
percussively driving the percussive augmenter bit using an actuator; and
providing power to the actuator using an electrical power transfer mechanism, wherein the power is provided while being rotated by the rotary drill; and
wherein a hammering action from the actuator and rotation from the rotary drill are applied directly to the material being drilled; and
wherein the actuator comprises a piezoelectric actuator.

9. The method of claim 8 wherein the hammering action comprises a vibratory hammering action.

10. The method of claim 8 further comprising providing water for bit cooling and borehole cleaning using a mechanical slip-ring.

11. The method of claim 8 wherein the actuator allows for water to be used for cooling and removal of extraneous materials.

12. A method for drilling material comprising:
mounting a connection shaft of a percussive augmenter bit onto a rotary drill, wherein the percussive augmenter bit is rotated by the rotary drill;
percussively driving the percussive augmenter bit using an actuator;
providing power to the actuator using an electrical power transfer mechanism, wherein the power is provided while being rotated by the rotary drill; and
assuring a tip of the percussive augmenter bit does not rotate separately from the actuator using keys and slots interfaces;
wherein a hammering action from the actuator and rotation from the rotary drill are applied directly to the material being drilled.

13. A method for drilling material comprising:
mounting a connection shaft of a percussive augmenter bit onto a rotary drill, wherein the percussive augmenter bit is rotated by the rotary drill;
percussively driving the percussive augmenter bit using an actuator; and
providing power to the actuator using an electrical power transfer mechanism, wherein the power is provided while being rotated by the rotary drill; and
wherein a hammering action from the actuator and rotation from the rotary drill are applied directly to the material being drilled; and
wherein the percussive augmenter bit further comprises a hollow coring section, wherein an internal hollow section length of the hollow coring section dictates a drilling depth without a need to remove produced core material.

* * * * *